(12) United States Patent
Ootsuka et al.

(10) Patent No.: US 9,296,318 B2
(45) Date of Patent: Mar. 29, 2016

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Taiyou Ootsuka, Toyota (JP); Tomokazu Igarashi, Miyoshi (JP); Eiji Mizutani, Kariya (JP); Keiichi Saito, Toyota (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 33 days.

(21) Appl. No.: 14/466,276

(22) Filed: Aug. 22, 2014

(65) Prior Publication Data

US 2014/0360301 A1 Dec. 11, 2014

Related U.S. Application Data

(63) Continuation of application No. 13/302,204, filed on Nov. 22, 2011.

(30) Foreign Application Priority Data

Nov. 29, 2010 (JP) .................................. 2010-264765

(51) Int. Cl.
*G05G 13/00* (2006.01)
*B60N 2/44* (2006.01)
(Continued)

(52) U.S. Cl.
CPC .............. *B60N 2/442* (2013.01); *B60N 2/0296* (2013.01); *B60N 2/062* (2013.01); *B60N 2/065* (2013.01);
(Continued)

(58) Field of Classification Search
CPC ...... B60N 2/005; B60N 2/045; B60N 2/0868; B60N 2/0831
USPC ............. 74/471 R; 297/358, 337, 338, 361.1, 297/344.1
See application file for complete search history.

(56) References Cited

U.S. PATENT DOCUMENTS 2,918,109 A 12/1959 Schliephacke
3,164,407 A 1/1965 Schliephacke
(Continued)

FOREIGN PATENT DOCUMENTS

DE 10052234 5/2002
DE 102004015450 11/2005
(Continued)

OTHER PUBLICATIONS

Japanese Office action dated May 7, 2014, along with an English-language translation thereof.
(Continued)

*Primary Examiner* — William Kelleher
*Assistant Examiner* — Zakaria Elahmadi
(74) *Attorney, Agent, or Firm* — Greenblum & Bernstein, P.L.C.

(57) ABSTRACT

An actuating mechanism (release mechanism) includes an operating pin (operating mechanism) that is operated by an operating lever, a first link that is operated by the operating pin to release a lock of a longitudinal slide mechanism, and a second link that is operated to release a lock of a lateral slide mechanism. A transmitting portion that receives operating force of the lever transmitted from the operating pin and transmits the operating force to a lock portion of each slide mechanism, and an escape portion that allows the operating force transmitted from the operating pin to escape are formed side by side on each of the links, and power transmitted from the lever to each of the links via the operating pin is allowed to escape during operation.

5 Claims, 12 Drawing Sheets (51) Int. Cl.
  *B60N 2/02* (2006.01)
  *B60N 2/06* (2006.01)
  *B60N 2/07* (2006.01)
  *B60N 2/08* (2006.01)
  *B60N 2/12* (2006.01)
  *G05G 9/08* (2006.01)

(52) U.S. Cl.
  CPC ............ *B60N 2/0705* (2013.01); *B60N 2/0715* (2013.01); *B60N 2/0818* (2013.01); *B60N 2/0843* (2013.01); *B60N 2/12* (2013.01); *G05G 9/08* (2013.01); *Y10T 74/20012* (2015.01)

(56) References Cited

U.S. PATENT DOCUMENTS

| | | | |
|---|---|---|---|
| 3,299,466 A | 1/1967 | Heinz | |
| 4,653,807 A | 3/1987 | Hirose et al. | |
| 4,834,452 A | 5/1989 | Goodrich | |
| 5,813,726 A | 9/1998 | Husted | |
| 6,024,398 A | 2/2000 | Horton et al. | |
| 6,106,067 A | 8/2000 | Zhuang et al. | |
| 6,474,739 B1 | 11/2002 | Lagerweij | |
| 6,857,702 B2 | 2/2005 | Becker et al. | |
| 6,935,691 B1 | 8/2005 | Sasaki et al. | |
| 7,588,293 B2 | 9/2009 | Kojima | |
| 7,959,229 B2 | 6/2011 | Ishijima et al. | |
| 8,162,404 B2 | 4/2012 | Ueda | |
| 8,596,720 B2 | 12/2013 | Ootsuka et al. | |
| 2012/0175932 A1 | 7/2012 | Moriyama et al. | |
| 2012/0223561 A1 | 9/2012 | Hurst, III et al. | |

FOREIGN PATENT DOCUMENTS

| | | |
|---|---|---|
| EP | 0800952 | 10/1997 |
| FR | 2824795 | 11/2002 |
| JP | 2008-201235 | 9/2008 |
| JP | 2009-292435 | 12/2009 |
| WO | 2006/114084 | 11/2006 |

OTHER PUBLICATIONS

Germany Office action, dated Mar. 19, 2013 along with an english translation thereof.

VEHICLE SEAT

INCORPORATION BY REFERENCE

This application is a continuation application of co-pending U.S. patent application Ser. No. 13/302,204, filed Nov. 22, 2011, which claims priority to Japanese Patent Application No. 2010-264765, filed on Nov. 29, 2010. The contents of which are expressly incorporated herein by reference in their entireties.

BACKGROUND OF THE INVENTION

1. Field of the Invention

The invention relates to vehicle seat. More particularly, the invention relates to a vehicle seat provided with an actuating mechanism that actuates two mechanisms in response to an operation of a single lever.

2. Description of the Related Art

Japanese Patent Application Publication No. 2009-292435 (JP-A-2009-292435) describes a vehicle seat provided with an actuating mechanism that releases locks of two mechanisms in response to an operation of a single lever. The two mechanisms are configured such that the lock of one is released first by the lever being operated, and the lock of the other is then released by the lever being operated further.

In this related art, a mechanism is provided that allows the power that is transmitted to escape midway so that an unreasonable load will not be applied to the mechanism on the side where the lock is released first due to the progression of the lever operation. However, the mechanism on the side where the lock is released later is configured to continue to receive a load from the operation of the lever even after the lock has been released by the progression of the lever operation. Therefore, it is difficult to set sufficient allowance for the lever operating amount, which is problematic.

SUMMARY OF THE INVENTION

In view of the foregoing problem, the invention provides a vehicle seat in which, in an actuating mechanism that actuates two mechanisms in response to an operation of a single lever, an excessive load following the lever operation will not be applied to the mechanisms even if sufficient operating amount allowance is provided for the lever.

A first aspect of the invention relates to a vehicle seat that includes a first mechanism; a second mechanism; and an actuating mechanism that actuates the first mechanism and the second mechanism in response to an operation of a single lever. The actuating mechanism has an operating mechanism that is operated by the lever, a first link that is operated by the operating mechanism to actuate the first mechanism, and a second link that is operated to actuate the second mechanism. Also, a transmitting portion that receives operating force of the lever transmitted from the operating mechanism and transmits the operating force to the first and second mechanisms, and an escape portion that allows the operating force transmitted from the operating mechanism to escape are formed side by side on each of the links, and power transmitted from the lever to each of the links via the operating mechanism is allowed to escape during operation.

According to the vehicle seat having the structure described above, having the transmitting portion and the escape portion formed side by side on each of the links, and allowing the power transmitted from the lever to the links to escape midway enables the operating force of the lever after the mechanisms have been actuated to escape so that the operating force does not affect the links. Therefore, even if sufficient operating amount allowance is provided for the lever, an excessive load following operation of the lever will not be applied to the mechanisms.

In the vehicle seat described above, the links may be pivotally supported around a common shaft.

According to the vehicle seat having the structure described above, pivotally providing the links around a common shaft enables the transmitting portions and the escape portions to be arranged side by side in order in the radial direction so that they are consolidated in one location, such that both links can be rotated or movement is allowed to escape so that both links will not rotate by a single actuating mechanism. As a result, the structure is able to be made more compact.

Also, a connecting position of a first cable that is connected to the first link may be farther away from the shaft than a connecting position of a second cable that is connected to the second link.

According to the vehicle seat described above, the amount of movement of the first cable is able to be made greater than the amount of movement of the second cable, when the first link and the second link are rotated the same angle.

Also, the transmitting portion of each of the links may have a shape that extends flat, and the escape portion may have a curved shape.

According to the vehicle seat described above, when the first link and the second link are rotated by the operating mechanism, power is transmitted according to the operating amount when the operating mechanism transmits power via the transmitting portion that extends flat, but power is not transmitted according to the operating amount when the operating mechanism transmits power via the escape portion that has a curved shape. Therefore, an unreasonable load will not be applied to the cables and the first and second mechanisms.

Moreover, in the vehicle seat described above, the links may be arranged side by side in an axial direction.

According to the vehicle seat described above, arranging the links side by side in the axial direction enables the links to be arranged so that their movable ranges overlap in the axial direction. As a result, the actuating mechanism can be made compact in the radial direction.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiment of the invention will hereinafter be described with reference to the accompanying drawings.

Figure 1:
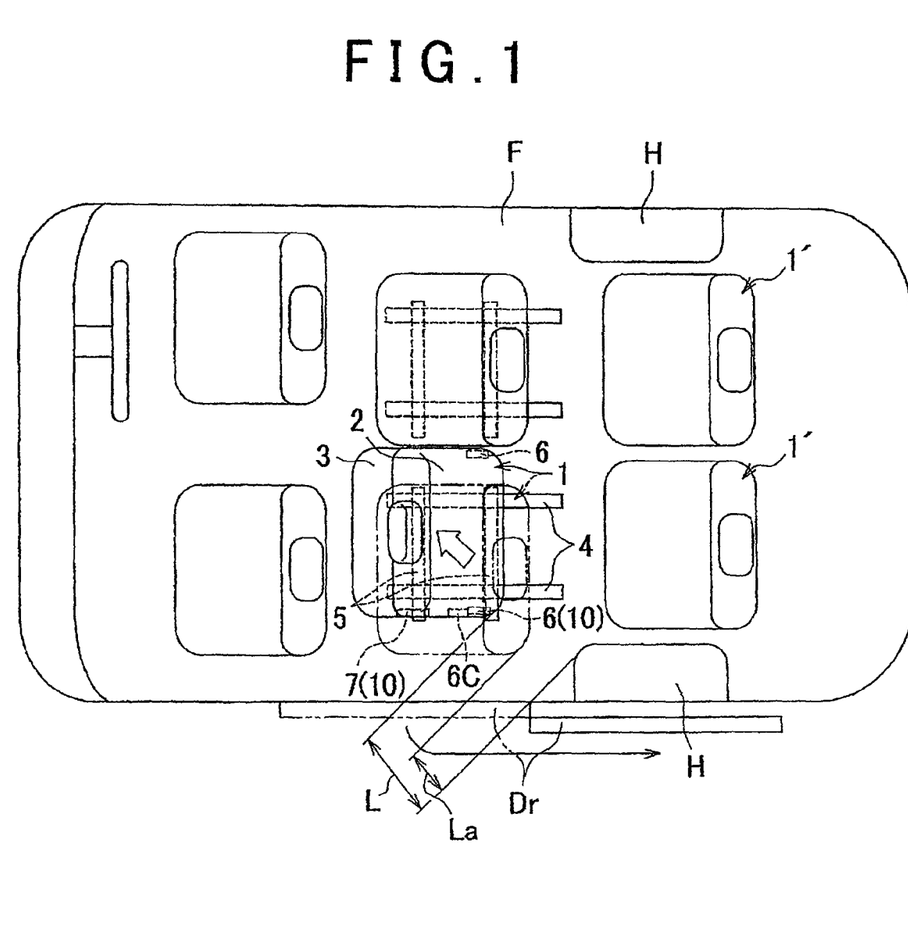
FIG. 1 is a plan view schematically showing the structure of a vehicle seat according to one example embodiment of the invention.
Figure 2:
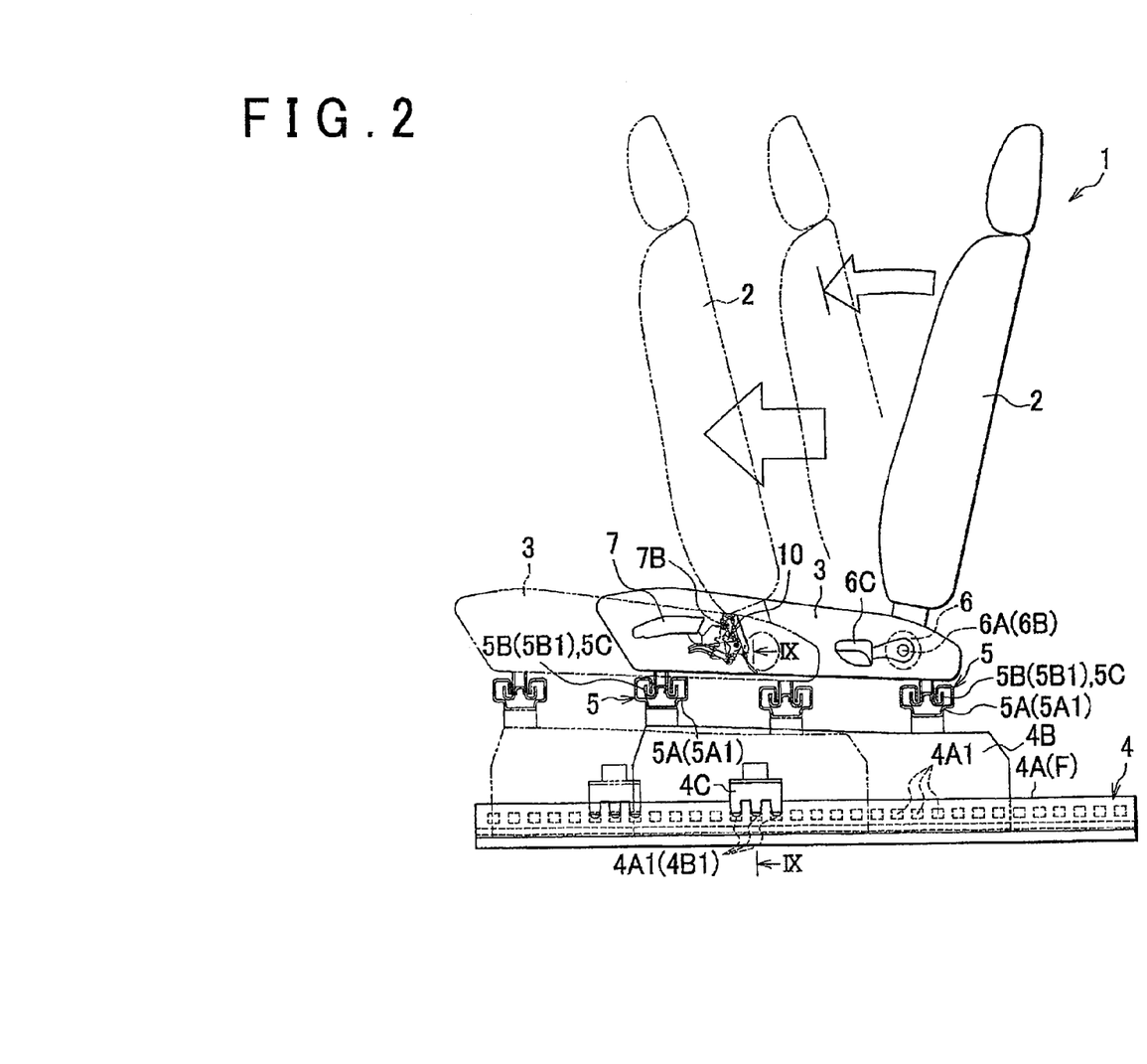
FIG. 2 is a side view of the vehicle seat according to the example embodiment.

First, the structure of a vehicle seat according to an example embodiment will be described with reference to FIGS. 1 to 12. The vehicle seat in this example embodiment is configured such that a seat main body 1 is able to slide in the longitudinal direction of the vehicle (i.e., longitudinally) as well as in the width direction of the vehicle (i.e., laterally), by a first mechanism (e.g., a longitudinal slide mechanism 4) and a second mechanism (e.g., a lateral slide mechanism 5), respectively, with respect to a vehicle floor F, as shown in FIG. 1. The longitudinal slide mechanism 4 and the lateral slide mechanism 5 are always in slide-locked states. The operation to release these locks is performed by operating an operating lever 7 provided on an outer side portion of the seat main body 1, as shown in FIG. 2. Here, the operating lever 7 is one example of the lever of the invention.

Also, this operation to release the locks may also be performed by an operation that involves operating a release lever 6C provided on the outer side portion of the seat main body 1, and tilting a seat back 2 to a forward tilted position that will be described later. When a release operation is performed by operating this release lever 6C, the seat main body 1 is placed in a state in which it is able to slide toward the inside and front of the vehicle with the seat back 2 in the forward tilted position and thus is bent over compactly toward the front of the vehicle, as shown in FIG. 1, which enables a space L for getting into and out of a back row (third row seat 1') of seats from a door Dr on that side to be wider than the initial space La before the seat is moved out of the way.

Next, each structure of the vehicle seat will be described in detail. As shown in FIG. 2, the seat main body 1 includes a seat back 2 that is a backrest, and a seat cushion 3 that is a sitting portion. The lower end portion on both sides of the seat back 2 is connected, via a reclining mechanism 6 that functions as a rotating shaft device that can be stopped from rotating, to a rear end portion on both sides of the seat cushion 3. Accordingly, the seat back 2 is retained with the backrest angle constantly fixed with respect to the seat cushion 3 by the reclining mechanisms 6. The rotation-locked state of the reclining mechanisms 6 can be released all together by operating the release lever 6C described above.

Figure 10:
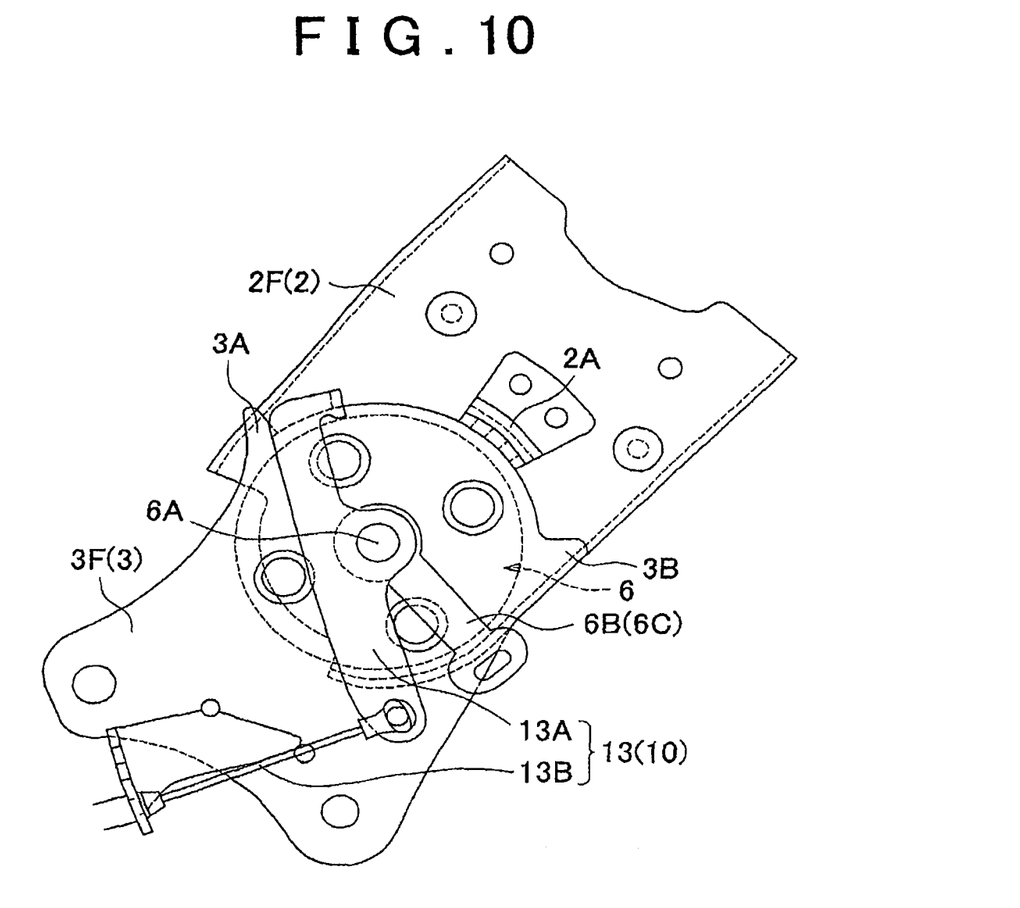
FIG. 10 is an enlarged view of the structure of a transmitting mechanism of the vehicle seat according to the example embodiment.

More specifically, as shown in FIG. 10, the reclining mechanisms 6 are interposed between an outer plate portion of both side frames of a back frame 2F that is the frame of the seat back 2, and an inner plate portion of both side frames of a cushion frame 3F that is the frame of the seat cushion 3, and are provided connecting these together. Also, the reclining mechanisms 6 are such that operating arms 6B that are integrally connected to an operating shaft 6A that protrudes through a center portion of the operating arms are rotatably operated via a cable, not shown, by the release lever 6C described above (see FIG. 2) being operated, and the rotation-locked states of the reclining mechanisms 6 can be released together by the operating shafts 6A being rotatably operated.

According to this release operation, the fixed state of the backrest angle is released, such that the seat back 2 is able to tilt forward and backward about the center shaft axis (i.e., the axis of the operating shafts 6A) of the reclining mechanisms 6. Accordingly, when an occupant is not seated in the seat main body 1, the seat back 2 can be tilted to the forward tilted position shown in FIG. 11 by the urging force of a spring, not shown, that is strung between it and the seat cushion 3. More specifically, in the seat back 2, retaining plates 2A formed in L-shapes and fixed to both side frames of the back frame 2F are able to tilt forward or backward to positions in which they abut against a front protrusion (i.e., a forward tilt stopper 3A) or a rear protrusion (i.e., a back tilt stopper 3B) formed on both side frames of the cushion frame 3F of the seat cushion 3. The retaining plates 2A are retained by falling into positions where they hit the forward tilt stopper 3A, by the fixed state of the backrest according to the reclining mechanisms 6 being released and the retaining plates 2A being urged forward by the spring.

Next, as shown in FIGS. 1 and 2, a lower portion of the seat cushion 3 is supported provided on the vehicle floor F via a pair of left and right longitudinal slide mechanisms 4 and a pair of front and back lateral slide mechanisms 5 that are stacked and joined together in the shape of a pound sign. Here, each longitudinal slide mechanism 4 has a slide rail 4A that extends lengthwise in the longitudinal direction of the vehicle, a slider 4B that is incorporated so as to be able to slide along the slide rail 4A, and a lock pawl 4C that is able to lock movement of the slider 4B with respect to the slide rail 4A. The slide rails 4A are provided fixed on the vehicle floor F. On the other hand, each lateral slide mechanism 5 has a slide rail 5A that extends lengthwise in the width direction of the vehicle, a slider 5B that is incorporated so as to be able to slide along the slide rail 5A, and a lock pawl 5C that is able to lock movement of the slider 5B with respect to the slide rail 5A. The slide rails 5A are provided fixed, spanning between the upper portions of the sliders 4B of the longitudinal slide mechanisms 4 described above. Also, both side frames of the cushion frame 3F of the seat cushion 3 are provided fixed, spanning between the upper portions of the sliders 5B, to the sliders 5B that are mounted to these slide rails 5A.

Figure 9:
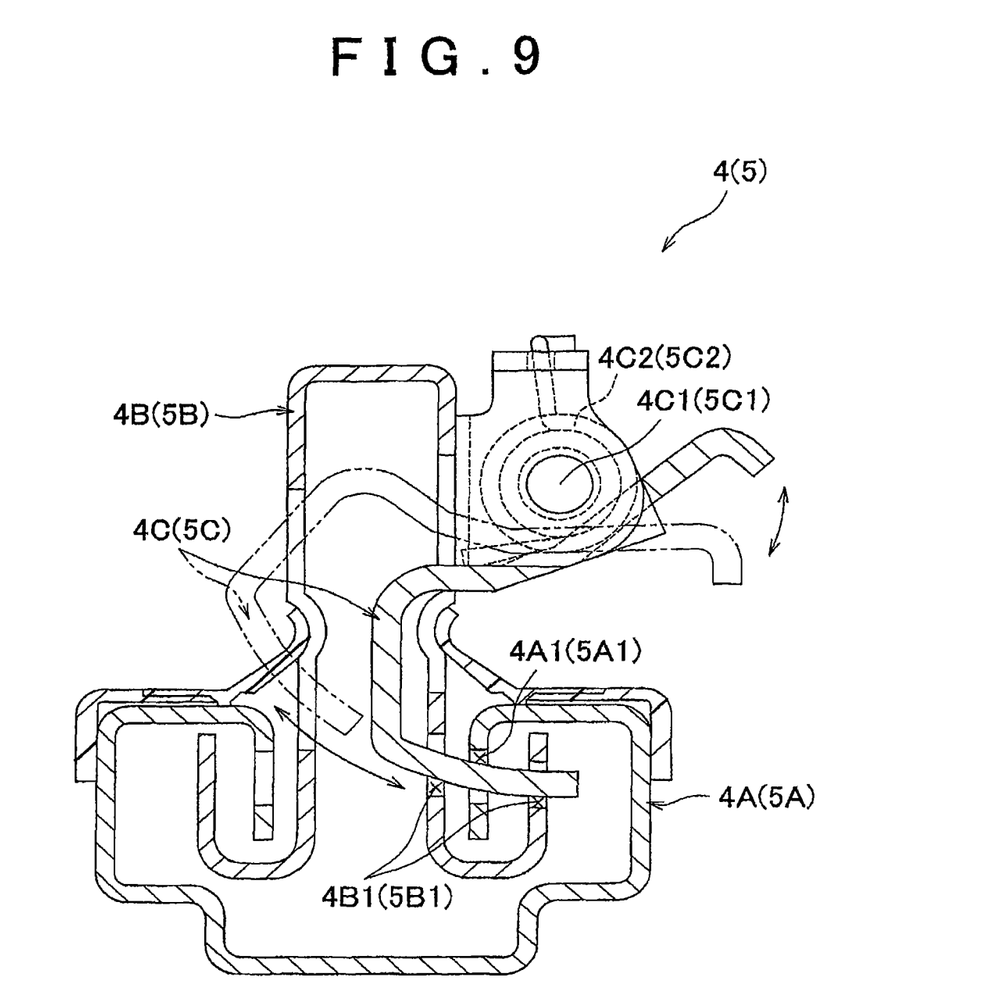
FIG. 9 is a sectional view taken along line IX-IX in FIG. 2, that shows a lock structure of the longitudinal slide mechanism (and the lateral slide mechanism) of the vehicle seat according to the example embodiment.

Next, the slide lock structures of the longitudinal slide mechanisms 4 and the lateral slide mechanisms 5 will be described with reference to FIG. 9. The basic structure of both of these slide lock structures is the same, so the following description will be centered around the slide lock structure of the longitudinal slide mechanism 4, while collectively referring to the structure of the slide lock structure of the lateral slide mechanism 5, that has basically the same structure, by placing its reference characters in parentheses. That is, the lock pawl 4C (5C) is provided rotatably shaft-connected to the slider 4B (5B) by a spindle 4C1 (5C1), and is constantly retained in a state that stops movement of the slider 4B (5B) by the tip end of the lock pawl 4C (5C) passing through a lock hole 4B1 (5B1) formed in the slider 4B (5B) and a lock hole 4A1 (5A1) formed in the slide rail 4A (5A), by rotation (rotation in the counterclockwise direction in the drawing) from the urging force of a spring 4C2 (5C2) hooked between it and the slider 4B (5B). The lock pawl 4C (5C) releases the slide lock state of the slider 4B (5B) by rotating in a direction (clockwise in the drawing) such that it pulls out of the lock holes 4A1 (5A1) and 4B1 (5B) against the urging force of the spring 4C2 (5C2), as shown by the virtual lines in FIG. 9, in response to a cable 14A (15A) being pulled by the operating lever 7 being operated. The lock holes 4A1 (5A1) that are formed in the slide rail 4A (5A) are formed in multiple locations in a line at equidistant intervals in the length direction of the slide rail 4A (5A), such that the sliding movement of the slider 4B (5B) can be locked over a wide area.

Figure 3:
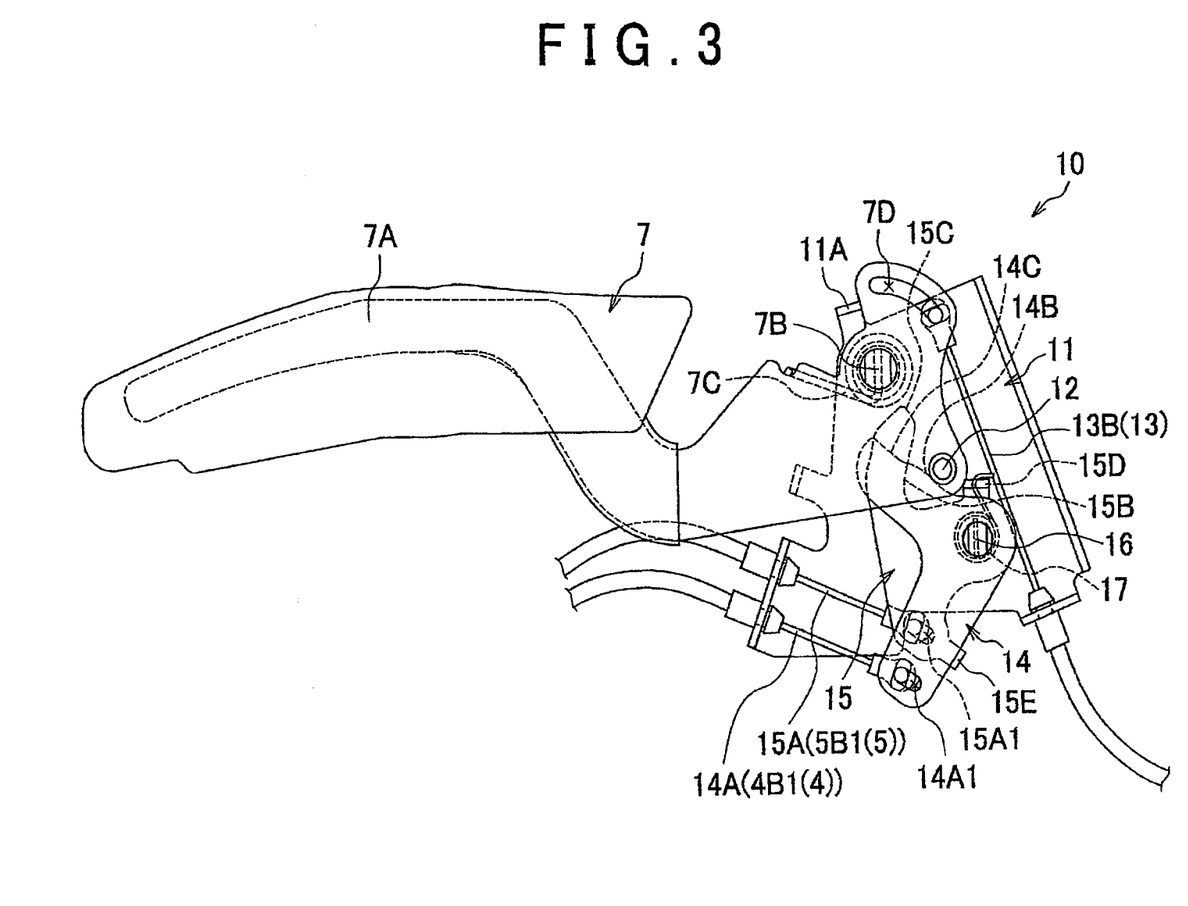
FIG. 3 is an enlarged view of an actuating mechanism of the vehicle seat according to the example embodiment.
Figure 8:
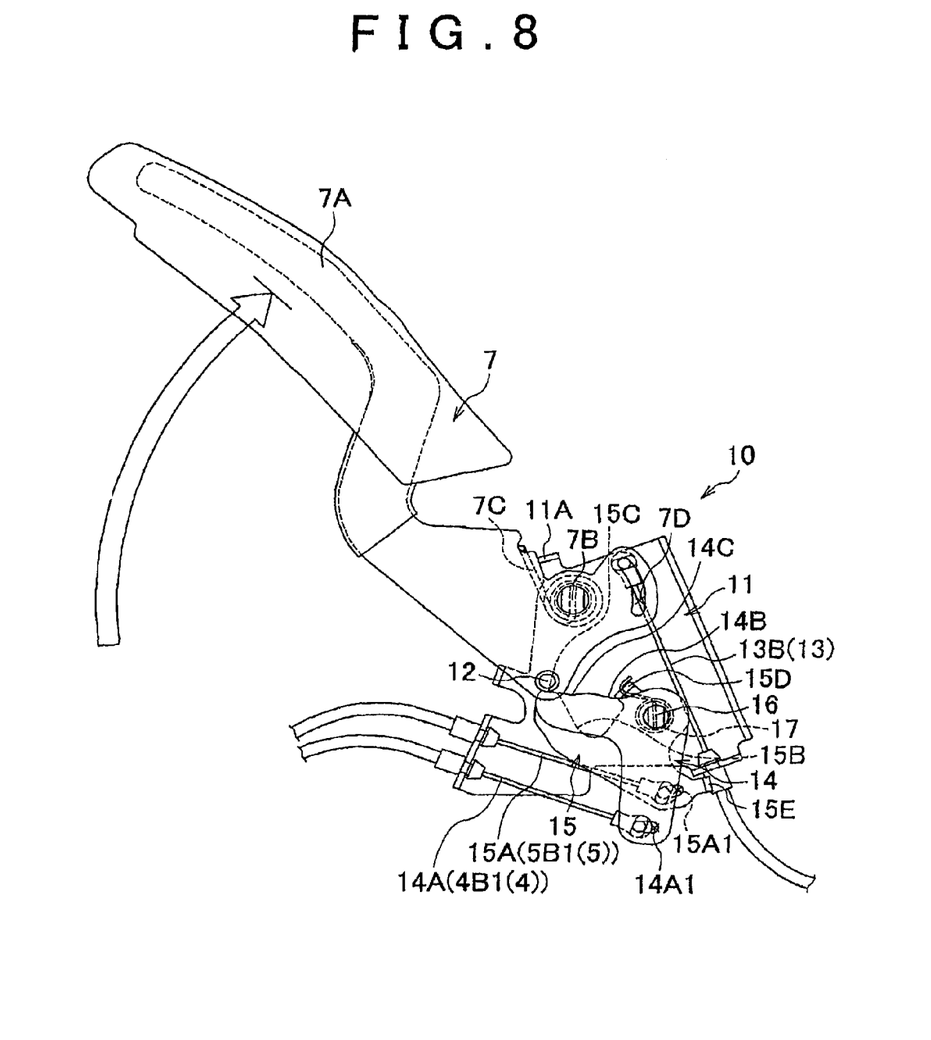
FIG. 8 is an enlarged view showing a state in which the operating lever has been operated to the maximum position.

Next, the structures of the operating lever 7 described above and a release mechanism 10 (one example of the actuating mechanism of the invention) that releases the slide lock states of the longitudinal slide mechanisms 4 and lateral slide mechanisms 5 in response to operation of the operating lever 7, will be described. The operating lever 7 is provided shaft-connected, in a manner that enables it to be pulled up by the rotation of a connecting shaft 7B, to a base plate 11 that is integrally fixed to the cushion frame 3F of the seat cushion 3, as shown in FIG. 3. The operating lever 7 is constantly rotationally urged in a direction (counterclockwise in the drawing) in which it is pulled down with respect to the base plate 11 by the urging force of a spring 7C that is hooked between it and the base plate 11, and thus kept in a state in which it is retained abutting against a stopper 11A formed on an upper end portion of the base plate 11 from the rear. The operating lever 7 is configured such that, when an operating portion 7A that is formed, with a resin grip attached, on an arm portion that extends out toward the front of the vehicle, of the operating lever 7 is pulled upward, the operating lever 7 consequently transmits that operating force to the release mechanism 10. Here, the operating lever 7 is pulled up until it reaches a position where it is stopped by abutting against a stopper 11A formed on an upper end portion of the base plate 11 from the front, as shown in FIG. 8.

Figure 11:
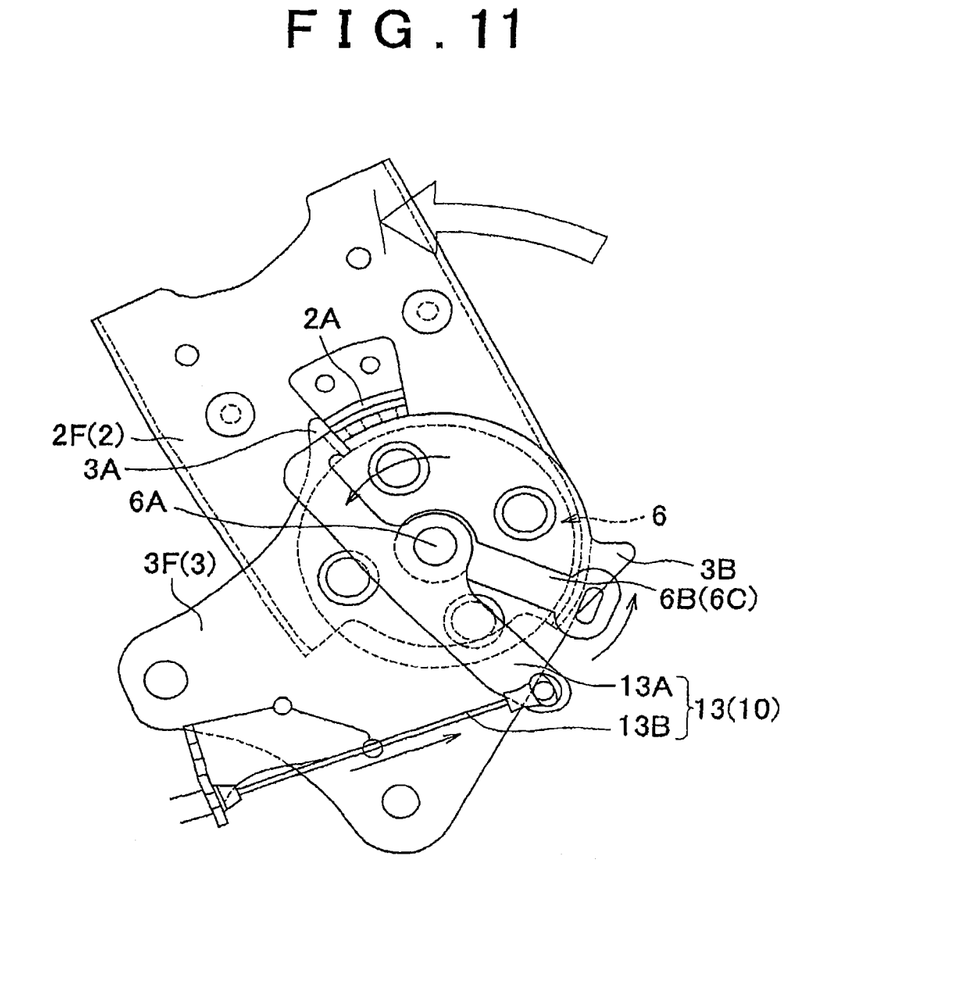
FIG. 11 is an enlarged view showing a state in which the transmitting mechanism is actuated by a seat back being tilted forward, in the vehicle seat according to the example embodiment.
Figure 12:
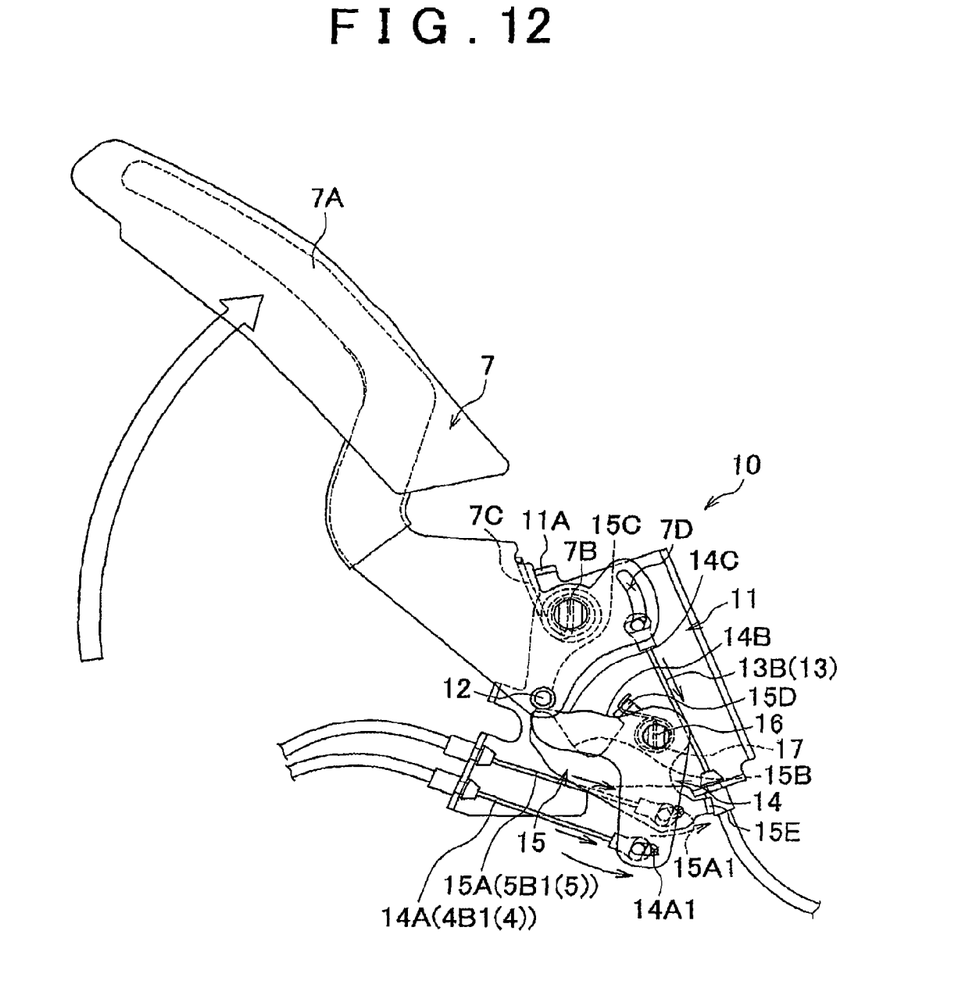
FIG. 12 is an enlarged view showing a state in which the operating lever is operated by the seat back being tilted forward, in the vehicle seat according to the example embodiment.

The release mechanism 10 has an operating pin 12, a transmitting mechanism 13, a first link 14, and a second link 15, as shown in FIG. 3. Here, the operating pin 12 is an example of the operating mechanism of the invention. The operating pin 12 is provided integrally joined with the operating lever 7 and moves when the operating lever 7 is pulled upward, so as to push and rotate the first link 14 and the second link 15 that will be described later. As shown in FIG. 10, the transmitting mechanism 13 has an operating arm 13A provided rotatably shaft-connected to the operating shaft 6A of the reclining mechanism 6 of the outer side portion, and an operating cable 13B that connects the lower end portion of this operating arm 13A with the rear upper end portion of the operating lever 7 shown in FIG. 3. Initially, the former operating arm 13A shown in FIG. 10 is retained, via the operating cable 13B, with the upper end portion of the operating arm 13A exposed along the path of forward rotational movement of the retaining plate 2A that is fixed to the back frame 2F of the seat back 2 described above, as shown in FIG. 10, by the force with which the operating lever 7 shown in FIG. 3 is kept in the initial position by the urging force of the spring 7C. With the latter operating cable 13B, the end portion on the side that is connected to the operating lever 7 is hooked inside a long hole 7D formed in the operating lever 7, as shown in FIG. 3, such that the operating cable 13B is initially retained in the lower end portion of the long hole 7D. The long hole 7D is formed curved in the shape of an arc centered around the connecting shaft 7B. As shown in FIG. 11, with the transmitting mechanism 13 of this structure, the operating arm 13A is pushed by the retaining plate 2A and rotates counterclockwise in the drawing, thus pulling the operating lever 7 up, as shown in FIG. 12, via the operating cable 13B, in response to the seat back 2 being tilted to the forward tilted position by the release lever 6C (see FIG. 2) described above being operated.

As shown in FIG. 3, the first link 14 is provided side by side with the second link 15 in the axial direction, and is provided shaft-connected so as to be able to rotate with respect to the base plate 11 by a rotating shaft 16, together with the second link 15. More specifically, the rotating shaft 16 is integrally joined with the base plate 11, and the first link 14 and the second link 15 are pivotally provided so as to be able to rotate with respect to the rotating shaft 16. The first link 14 is formed in an L-shape with an arm that extends out in two directions in the radial direction about the rotating shaft 16. Of the portions of the arm that extends out in two directions, the portion where the arm extends out toward the upper front of the seat with respect to the rotating shaft 16 is a portion that is rotationally operated upon receiving transmission of rotational operating force from the operating pin 12 that is joined with the operating lever 7 described above. Also, the portion where the arm extends out toward the lower front of the seat with respect to the rotating shaft 16 is a portion that is connected to a cable 14A for releasing the lock pawl 4C of the longitudinal slide mechanism 4 shown in FIG. 9 described above, and that releases the lock of the longitudinal slide mechanism 4 by pulling the cable 14A in response to that rotational operation. The end portion of the cable 14A on the side that is connected to the first link 14 is provided hooked inside of a long hole 14A1 formed in the first link 14, as shown in FIG. 3. The long hole 14A1 is formed in a shape curved in an arc around the rotating shaft 16.

The second link 15 is formed in a shape of an arm that extends out in a T-shape toward the front of the seat, centered around the rotating shaft 16. A portion of the arm where the arm extends upward from the front side of the seat is a portion that is rotationally operated upon receiving rotational operating force transmitted by the operating pin 12 that is joined with the operating lever 7 described above. Also, a portion of the arm where the arm extends downward from the front side of the seat is a portion that is connected to a cable 15A for releasing the lock pawl 5C of the lateral slide mechanism 5 shown in FIG. 9 described above, and that releases the lock of the lateral slide mechanism 5 by pulling the cable 15A in response to the movement of that rotational operation. The end portion of the cable 15A on the side that is connected to the second link 15 is provided hooked inside of a long hole 15A1 formed in the second link 15, as shown in FIG. 3. The long hole 15A1 is formed in a shape curved in an arc around the rotating shaft 16.

More specifically, the cable 14A that is connected to the first link 14 described above is connected to the first link 14 in a position farther from the rotating shaft 16 than the cable 15A that is connected to the second link 15. As a result, the amount of movement in the pulling operation when the first link 14 and the second link 15 are rotated the same angle is greater with the cable 14A that is connected to the first link 14 than it is with the cable 15A that is connected to the second link 15.

Here, a spring 17 is hooked between a hooking portion 15D of the second link 15 and the rotating shaft 16, so the second link 15 is constantly rotatably urged in the in the clockwise direction in the drawing by the urging force of the spring 17. Also, a pawl 15E is formed, protruding out and bent back so as to be able to abut against an edge portion of the downward extending arm portion of the first link 14, on the arm portion that extends out and downward with respect to the seat, of the second link 15. Therefore, the second link 15 initially transmits the force by which it is rotatably urged in the clockwise direction in the drawing by the spring 17 to the first link 14 via the pawl 15E, such the first link 14 is also rotatably urged in the same direction, and the second link 15 stops rotating, and is thus retained, in a position where the first link 14 abuts with and is retained by the operating pin 12 that is fixed to the operating lever 7. In this retained state, the second link 15 does not abut against the operating pin 12. Instead, there is a gap in the rotational direction between the second link 15 and the operating pin 12.

Figure 4:
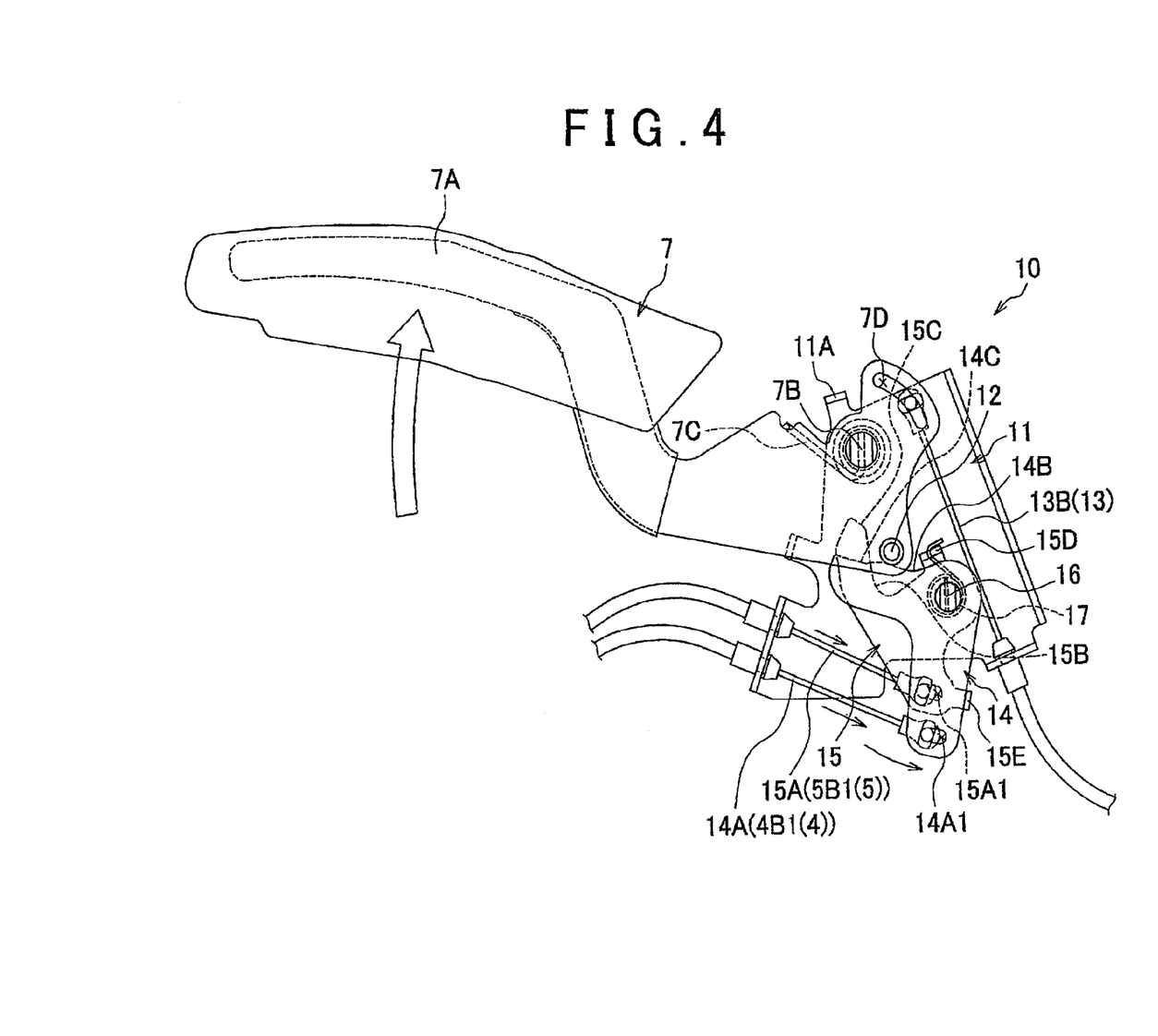
FIG. 4 is an enlarged view showing a state in which a lock of a longitudinal slide mechanism is released by operation of an operating lever of the vehicle seat according to the example embodiment.

The release mechanism 10 having this structure operates in the manner as described below in response to the operating lever 7 being pulled upward. That is, when the operating lever 7 is pulled upward from the initial position shown in FIG. 3, the arm portion of the first link 14 is first pushed around in the counterclockwise direction in the drawing by the operating pin 12, as shown in FIG. 4. As a result, the second link 15 in which the pawl 15E is abutted against the first link 14 is also pushed around by the first link 14, and thus rotates in the counterclockwise direction in the drawing, together with the first link 14. Also, from this rotation, the cable 14A that is connected to the first link 14 is pulled more than the cable 15A that is connected to the second link 15. As a result, the locked stated of the longitudinal slide mechanisms 4 is released.

Figure 5:
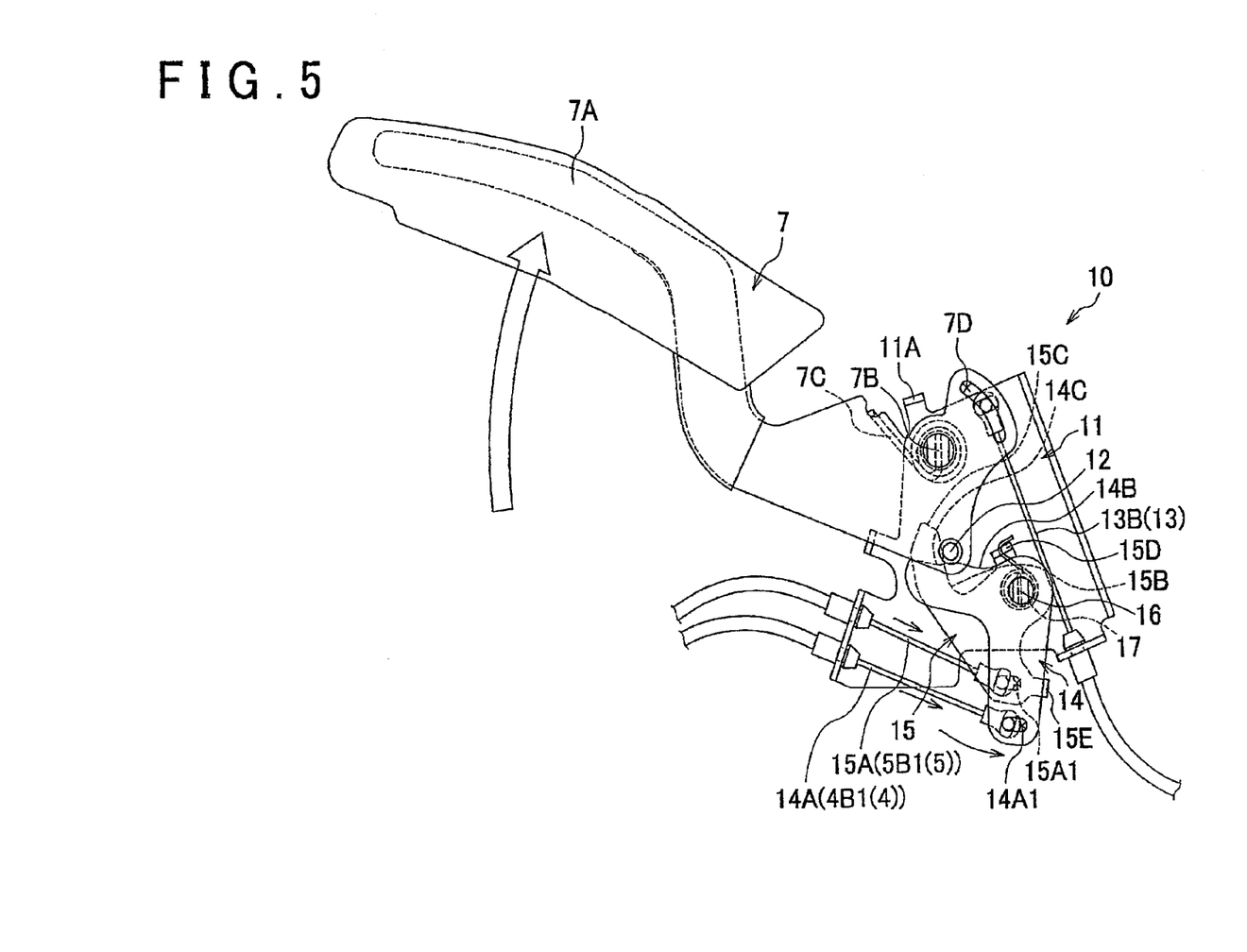
FIG. 5 is an enlarged view showing a state in which the operating force transmitted from the operating lever to a first link is allowed to escape.

Next, when operating lever 7 is pulled up even further, the operating pin 12 abuts against the arm portion on the side that protrudes upward with respect to the seat, of the second link 15, as shown in FIG. 5. Then, by pulling up the operating lever 7 still further from there, the operating pin 12 rotates the second link 15 in the counterclockwise direction in the drawing (see FIG. 6). As a result, the second link 15 leaves the first link 14 behind, rotating by itself a large amount, such that the cable 15A that is connected to the second link 15 is pulled more. As a result, the locked state of the lateral slide mechanisms 5 is released.

Figure 6:
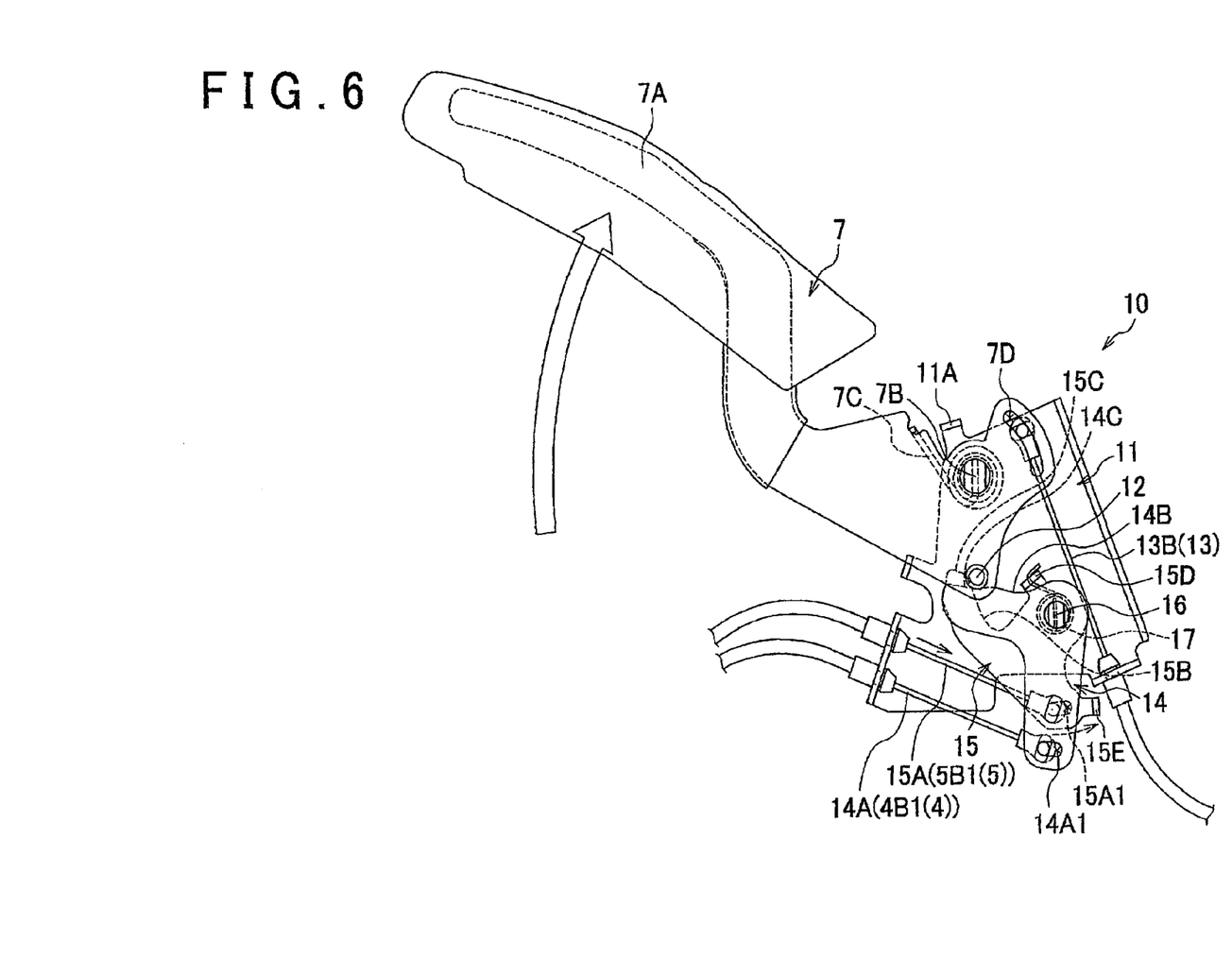
FIG. 6 is an enlarged view showing a state in which a lock of a lateral slide mechanism is released by operation of the operating lever.

Here, a transmitting portion 14B with a surface that extends flat in the radial direction, and an escape portion 14C with a surface that is curved in an arc shape, are formed next to each other in the radial direction, on an edge surface on the upper side in the drawing, of the arm portion that is pushed by the operating pin 12 of the first link 14. The former transmitting portion 14B abuts against the operating pin 12 described above when the first link 14 is in the initial state. The latter escape portion 14C forms an arced surface centered around the connecting shaft 7B, when the first link 14 is rotated to the rotational position in FIG. 5 by the operating pin 12. As the operating lever 7 is pulled up, the first link 14 structured as described above is rotated by the operating pin 12 moving along the area where the transmitting portion 14B is formed, until a rotational position (the position in FIG. 5) midway from the initial rotational position where the first link 14 started to be pushed around by the operating pin 12 in response to the operating lever 7 being pulled up, as shown in FIGS. 3 to 5. However, as shown in FIGS. 5 and 6, in the area beyond the midway rotational position, the operating pin 12 will move along the area where the escape portion 14C is formed, so even if the operating lever 7 continues to be pulled up, the first link 14 will not receive the power transmitted from the operating pin 12. That is, the movement of the operating pin 12 is allowed to escape, so the first link 14 will not continue to rotate. As a result, even more excessive pull operating force from the cable 14A will not be applied to the longitudinal slide mechanism 4 in which the slide lock is released first, after that release operation, so an unreasonable load will not be applied to the lock structure portion (i.e., the lock pawl 4C; see FIG. 9) of the longitudinal slide mechanism 4 and the cable 14A.

Figure 7:
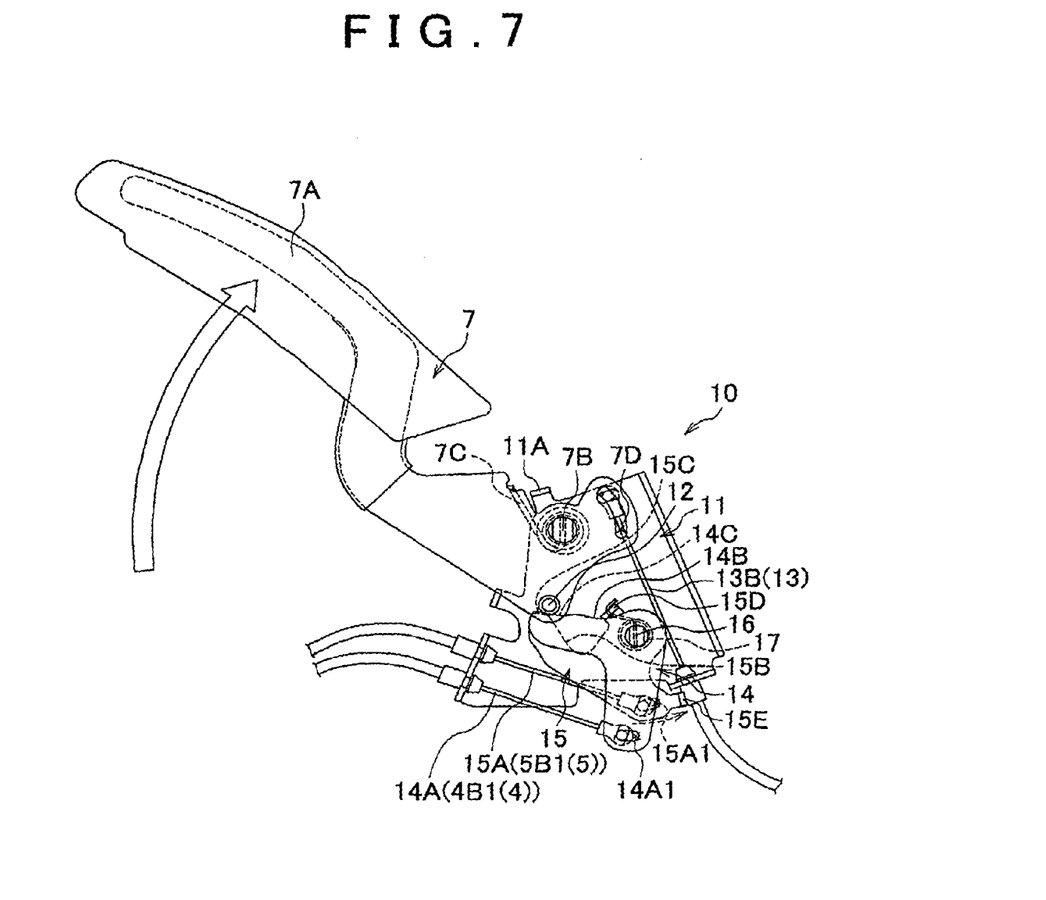
FIG. 7 is an enlarged view showing a state in which the operating force transmitted from the operating lever to a second link is allowed to escape.

Also, similarly, a transmitting portion 15B with a surface that extends flat in the radial direction, and an escape portion 15C with a surface that is curved in an arc shape, are formed next to each other in the radial direction, on an edge surface on the right side in the drawing, of the arm portion that is pushed by the operating pin 12 of the second link 15. The former transmitting portion 15B abuts against the operating pin 12 before the escape portion 15C does, in response to the operating lever 7 being pulled up, as shown in FIG. 5. The latter escape portion 15C forms an arced surface that is curved in an arc centered around the connecting shaft 7B, when the second link 15 is rotated to the rotational position in FIG. 7 by the operating pin 12. As the operating lever 7 is pulled up, the second link 15 structured as described above is rotated by the operating pin 12 moving along the area where the transmitting portion 15B is formed, until a rotational position (the position in FIG. 5) midway from the initial rotational position where the second link 15 started to be pushed around by the operating pin 12 in response to the operating lever 7 being pulled up, as shown in FIGS. 5 to 7. However, as shown in FIGS. 7 and 8, in the area beyond the midway rotational position, the operating pin 12 will move along the area where the escape portion 15C is formed, so even if the operating lever 7 continues to be pulled up, the second link 15 will not receive the power transmitted from the operating pin 12. That is, the movement of the operating pin 12 is allowed to escape, so the second link 15 will not continue to rotate. As a result, even more excessive pull operating force from the cable 15A will not be applied to the lateral slide mechanism 5 in which the slide lock has been released, after that release operation, so an unreasonable load will not be applied to the lock structure portion (i.e., the lock pawl 5C; see FIG. 9) of the lateral slide mechanism 5 and the cable 15A.

Also, as shown in FIG. 2, the lock release operations of the longitudinal slide mechanism 4 and the lateral slide mechanism 5 via the release mechanism 10 may similarly be performed by pulling up on the release lever 6C described above. That is, when the release lever 6C is operated, the seat back 2 tilts forward to the forward tilted position such that the operating arm 13A is pushed around, as illustrated in FIG. 11. This rotation causes the operating cable 13B to be pulled, such that the operating lever 7 is pulled up, as shown in FIG. 12. As a result, the release mechanism 10 operates to release the locks of the longitudinal slide mechanism 4 and the lateral slide mechanism 5, as illustrated in FIGS. 3 to 8.

In this way, according to the vehicle seat of the example embodiment, the transmitting portions 14B and 15B and the escape portions 14C and 15C are formed side by side, respectively, on the links 14 and 15, and power transmitted from the operating lever 7 to the links 14 and 15 is allowed to escape midway through the operation. As a result, the operating force of the operating lever 7 after the locks of the slide mechanisms 4 and 5 have been released is allowed to escape so that it is not transmitted to the links 14 and 15. Therefore, even if sufficient operating amount allowance is provided for the operating lever 7, an excessive load following operation of the operating lever 7 will not be applied to the mechanisms (i.e., the slide mechanisms 4 and 5).

Also, the links 14 and 15 are arranged side by side in the axial direction, so the links 14 and 15 can be arranged so that their movable ranges overlap in the axial direction. As a result, the release mechanism 10 (i.e., the actuating mechanism) can be made compact in the radial direction. Also, pivotally providing the links 14 and 15 around a common shaft enables the transmitting portions 14B and 15B and the escape portions 14C and 15C to be arranged side by side in order in the radial direction so that they are consolidated in one location, as shown in FIG. 3, such that both links 14 and 15 can be rotated or movement is allowed to escape so that both links 14 and 15 will not rotate by a single release mechanism 10 (i.e., the actuating mechanism). As a result, the structure is able to be more compact.

Heretofore, the invention has been described using one example embodiment, but the invention may also be carried out by various modes other than the example embodiment described above. For example, in the example embodiment described above, a structure in which the operating pin 12 for actuating the first link 14 and the second link 15 is integrally provided with the operating lever 7 is given as an example of the structure corresponding to the operating mechanism of the invention. However, another actuating mechanism such as a gear mechanism or a link mechanism that actuates the first link 14 and the second link 15 by receiving operating force transmitted from the operating lever 7 (lever) may also be employed.

Also, in the example embodiment described above, a structure in which the lock of the longitudinal slide mechanism 4 is released first and then the lock of the lateral slide mechanism 5 is released, as a result of the release mechanism 10 that corresponds to the actuating mechanism of the invention being actuated, is given as an example. However, the structure may also be one in which the lock of the lateral slide mechanism 5 is released first and then the lock of the longitudinal slide mechanism 4 is released. Also, the lock release operations of these slide mechanisms 4 and 5 may be performed together. Further, the actuating mechanism of the invention is not limited to being used to release the locks of the longitudinal slide mechanism 4 and the lateral slide mechanism 5 as described in the example embodiment. To the contrary, the actuating mechanism of the invention may be used as a mechanism for actuating a variety of mechanisms provided in a vehicle seat.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A vehicle seat comprising:
   a first mechanism;
   a second mechanism; and
   an actuating mechanism that actuates the first mechanism and the second mechanism in response to an operation of a single lever,
   wherein the actuating mechanism has:
      an operating mechanism that is operated by the single lever;
      a first link that is operated by the operating mechanism to actuate the first mechanism;
      a second link that is operated to actuate the second mechanism;
      a transmitting portion that receives an operating force of the single lever transmitted from the operating mechanism and transmits the operating force to the first and second mechanisms; and
      an escape portion that allows the operating force transmitted from the operating mechanism to escape,
   wherein the transmitting portion and the escape portion are formed side by side on each of the first and second links such that power transmitted from the single lever to each of the first and second links via the operating mechanism is allowed to escape during operation of the single lever.

2. The vehicle seat according to claim 1, wherein the first and second links are pivotally supported around a common shaft.

3. The vehicle seat according to claim 2, wherein a connecting position of a first cable that is connected to the first link is farther away from the common shaft than a connecting position of a second cable that is connected to the second link.

4. The vehicle seat according to claim 2, wherein the transmitting portion of each of the first and second links has a shape that extends flat, and the escape portion has a curved shape.

5. The vehicle seat according to claim 1, wherein the first and second links are arranged side by side in an axial direction.

* * * * *